United States Patent
Krüger et al.

(10) Patent No.: US 7,437,337 B2
(45) Date of Patent: Oct. 14, 2008

(54) INTUITIVE AND RELIABLE CONTROL OF OPERATOR INPUTS IN SOFTWARE COMPONENTS

(75) Inventors: Richard Krüger, Regensburg (DE); Dieter Walter, Hessdorf (DE)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 10/576,616

(22) PCT Filed: Oct. 28, 2004

(86) PCT No.: PCT/EP2004/052687

§ 371 (c)(1),
(2), (4) Date: Apr. 21, 2006

(87) PCT Pub. No.: WO2005/043364

PCT Pub. Date: May 12, 2005

(65) Prior Publication Data

US 2007/0094177 A1    Apr. 26, 2007

(30) Foreign Application Priority Data

Oct. 31, 2003  (DE)  ................. 103 50 903

(51) Int. Cl.
G06E 1/00 (2006.01)
G06E 3/00 (2006.01)
G06F 15/18 (2006.01)
G06G 7/00 (2006.01)

(52) U.S. Cl. .................................. 706/20
(58) Field of Classification Search ............... 706/20
See application file for complete search history.

(56) References Cited

U.S. PATENT DOCUMENTS

| 5,197,013 | A | * | 3/1993 | Dundorf | 700/182 |
| 5,508,717 | A |   | 4/1996 | Miller | |
| 5,703,782 | A | * | 12/1997 | Dundorf | 700/182 |
| 5,808,601 | A |   | 9/1998 | Leah et al. | |
| 6,219,033 | B1 |   | 4/2001 | Rosenberg et al. | |
| 6,432,915 | B1 | * | 8/2002 | Bandman et al. | 514/2 |
| 6,459,952 | B1 | * | 10/2002 | Dundorf | 700/182 |
| 6,472,508 | B1 | * | 10/2002 | La Brie et al. | 530/350 |
| 6,486,300 | B1 | * | 11/2002 | Bandman et al. | 530/350 |

(Continued)

FOREIGN PATENT DOCUMENTS

DE    41 23 126 C1    6/1992

(Continued)

OTHER PUBLICATIONS

ABB Automation Products. "User Manual 42/72-3000-1 Maestro UX Operation and Observation Version 2.0 or higher", 2001.*

(Continued)

*Primary Examiner*—Michael B Holmes

(57) ABSTRACT

The invention relates to a system and a method for user-specific intuitive and secure control of operational inputs in software components with operational surfaces. Various operational elements on a surface can be reached with varying ease for the input of data, or for carrying out a confirmation action, for example, an OK click with the mouse. It is made easier or more difficult for an operator to carry out an input. The above is achieved, whereby input means, for example, a mouse are either drawn towards, or withdrawn away from the corresponding input regions. Erroneous inputs are thus avoided.

16 Claims, 2 Drawing Sheets

U.S. PATENT DOCUMENTS

| | | | | |
|---|---|---|---|---|
| 6,492,499 | B1* | 12/2002 | Hillman et al. | 530/396 |
| 6,503,733 | B1* | 1/2003 | Bandman et al. | 435/69.1 |
| 6,531,575 | B1* | 3/2003 | Bandman et al. | 530/350 |
| 6,545,129 | B1* | 4/2003 | Hillman et al. | 530/387.9 |
| 6,654,490 | B2* | 11/2003 | Love | 382/154 |
| 6,757,424 | B2* | 6/2004 | Love | 382/154 |
| 7,006,685 | B2* | 2/2006 | Love | 382/154 |

FOREIGN PATENT DOCUMENTS

| | | |
|---|---|---|
| DE | 198 58 647 A1 | 6/2000 |
| WO | WO 00/65871 A1 | 11/2000 |
| WO | WO 02/054200 A2 | 7/2002 |

OTHER PUBLICATIONS

A Network States of Agglomeration Lupu, C.; Niculiu, T.; EUROCON, 2007. The International Conference on "Computer as a Tool" Sep. 9-12, 2007 pp. 393-399 Digital Object Identifier 10.1109/EURCON.2007.4400307.*

Routability of Network Topologies in FPGAs Saldana, M.; Shannon, L.; Jia Shuo Yue; Sikang Bian; Craig, J.; Chow, P.; Very Large Scale Integration (VLSI) Systems, IEEE Transactions on vol. 15, Issue 8, Aug. 2007 pp. 948-951 Digital Object Identifier 10.1109/TVLSI. 2007.900746.*

Line Drawing as a Dynamic Process Bennett, J.; Pascucci, V.; Joy, K.; Computer Graphics and Applications, 2007. PG '07. 15th Pacific Conference on Oct. 29, 2007-Nov. 2, 2007 pp. 351-360 Digital Object Identifier 10.1109/PG.2007.42.*

An Efficient Approach Towards IP Network Topology Discovery for Large Multi-Subnet Networks Nazir, F.; Jameel, M.; Tarar, T.H.; Burki, I.A.; Ahmad, H.F.; Ali, A.; Suguri, H.; Computers and Communications, 2006. ISCC '06. Proceedings. 11th IEEE Symposium on Jun. 26-29, 2006 pp. 989-993 Digital Object Identifier 10.1109/ISCC.2006.30.*

Nova Southeastern University, "Microsoft Excel 2000", Jun. 27, 2003, pp. 1-9, Part II, Internet, URL: http://www.nova.edu/techtrain/apptrein/excel/int97.html, retrieved on Jun. 7, 2005. XP002330801.

"An Introduction to Unix Permissions", Jun. 9, 2000, pp. 1-3, Internet, URL: http://www.onlamp.com/pub/a/bsd/2000/09/06/FreeBDS_Basics.html, retrieved on Jun. 6, 2005, XP002330779.

* cited by examiner

INTUITIVE AND RELIABLE CONTROL OF OPERATOR INPUTS IN SOFTWARE COMPONENTS

CROSS REFERENCE TO RELATED APPLICATIONS

This application claims priority to the German application No. 10350903.8, filed Oct. 31, 2003, and to the International Application No. PCT/EP2004/052687, filed Oct. 28, 2004 which are incorporated by reference herein in their entirety.

FIELD OF INVENTION

The invention relates to a system and a method for user-specific intuitive and reliable control of operator inputs in software components with operator interfaces.

BACKGROUND OF INVENTION

To prevent random or unintentional inputs at software interfaces, e.g. in the internet, such inputs must generally be confirmed by the user. As users, who very frequently work with an interface that they know well, soon start to experience a sense of familiarity or find the confirmation prompts irritating, such prompts are often passed over unread or unchecked and simply confirmed. Such an unchecked response or confirmation can result in unwanted situations. In the automation environment in particular unchecked but confirmed inputs can lead to critical situations, in particular at process control interfaces, for example HMIs. Unintentional confirmation in an automation environment, particularly in process control, can cause not insignificant damage.

In the process control environment it is equally important for specific inputs to be confirmed by operators, who also have authorization to confirm corresponding inputs. Confirmation of inputs by unauthorized persons should be prevented.

Simple confirmation of operator inputs by a user authorized for this purpose is therefore desirable. A system is known from the patent U.S. Pat. No. 5,508,717, with which the speed of a mouse pointer on an operator interface is manipulated to make it easier for an operator to input or click on an icon.

A system and a method are known from the international publication WO 02/054200, with which different user rights are configured, specifically for use in the internet, such that the rights are associated with a mouse as the input means, with different inputs being able to be effected by users as a function of the mouse used at the time.

SUMMARY OF INVENTION

An object of the present invention is to specify a system and a method, which allow simple confirmation of inputs effected at an operator interface, with confirmation in particular being effected by correspondingly authorized persons.

The object is achieved by a system for user-specific control of operator inputs in software components, in particular of an automation system, with at least one operator interface for operating at least one software component, input areas and/or operating elements arranged on the operator interface for inputting and/or confirming commands and/or data by means of input means, at least one user profile stored in the system to describe the response of individual input areas and/or operating elements of the operator interface, with the input areas and/or operating elements being accessible to the input means for inputting commands and/or data as a function of the user profile.

The invention is based on the knowledge that when commands are input or operator inputs are confirmed, users can easily make errors or inputs by unauthorized users are easily confirmed. With almost all software products an input is generally protected by an additional confirmation of the input, if the input has relevant consequences. The input is most usually confirmed by means of so-called pop-up windows with messages such as "Do you really want to cancel?". Confirmation then generally involves clicking a yes or no button. During such a confirmation process a user can easily make errors, with routine confirmation possibly being given as a result of time pressure or a frequently used action, without the user really checking the input again in a considered manner.

Based on this knowledge the advantage of the present invention is that a user profile is stored in the system. An input can be confirmed by a simple action on the operator interface of the system as a function of the user profile. Confirmation is effected for example by a single input or activation of an action button using the input means. Activation can hereby be effected for example by simply passing the mouse over the action button, without requiring a specific clicking action. However activation by means of a mouse click would also be possible in a further embodiment. Because an input is made easy as a function of the user profile, in that the input means are so to speak attracted by the area on the operator interface, at which an input is to be effected, an input can be effected quickly and without further confirmation. In contrast an input can be made more difficult in that the input means are repelled by the point on the operator interface, at which an input is to be effected. This makes an input more difficult and the user is so to speak forced to overcome a resistance. The fact of having to overcome a resistance then provokes a response in the user; they notice that there is resistance and their attention is drawn to the operating element and the corresponding content, so that they consider such input and input errors are prevented.

Thus a user is so to speak prompted by the system to effect specific inputs quickly and the attraction of the input areas to the input means helps the said user to input data and confirm commands. In contrast said user must make more effort when a point is more difficult to access and pays the corresponding input window or confirmation button correspondingly greater attention once this resistance is overcome. This means that easier inputting and more considered inputting of data or commands is achieved as a function of the user profile.

A further advantageous embodiment of the invention is characterized in that the user profile is provided to describe the response of individual input areas and/or operating elements of the operator interface as a function of individual access and/or operating rights. Certain users can hereby be granted greater rights so that they have sole or preferred access and therefore easier operation of specific operating areas. This is favorable primarily in safety-critical areas, as only specially trained personnel are authorized to input specific data. The rights are stored in the user profile, which is created on the basis of different user rights of different users and can be stored. Certain operator inputs can only be effected, if the user has the corresponding authorization.

A further advantageous embodiment of the invention is characterized in that the system has storage means for storing access and/or operating rights, with provision for management of the access and/or operating rights via the user profile. With this advantageous embodiment of the invention it can be ensured that operating or access rights associated with specific users can be stored within the system. These access and operating rights can be managed via the user profile itself. If the individual user profile of a user changes, new access and operating rights are automatically stored in the storage means.

A further advantageous embodiment of the invention is characterized in that the system has recognition means for recognizing a user. This means that a user is recognized by the system, when said user starts to work with the system or to input at the operator interface. Recognition can take place for example by means of a password. Recognition can however also take place by means of biometric data, e.g. the recording or reading of a fingerprint via the input means. Further biometric data, e.g. iris scanning or other methods for pattern recognition can also be implemented to recognize a user.

A further advantageous embodiment of the invention is characterized in that the input means have a corresponding visualization on the operator interface. It is advantageous here if the user can see immediately on the operator interface where they are located with the input means on the interface. Visualization of the input means can be effected here by means of a pointer or another visualization component. If the user displaces or moves the input means to specific points on the operator interface, the corresponding visualization or pointer follows the input means. It would also be possible for the visualization or pointer to follow potential eye movements of a user, when the user focuses on specific areas on the screen or operator interface. It would also be possible for the eyes of the user themselves to operate as input means and for inputs or confirmation of operating elements to be effected by winking or other eye movements.

A further advantageous embodiment of the invention is characterized in that there is provision for a positive and/or negative acceleration of the input means visualized on the operator interface when approaching an operating element and/or an input area as a function of the user profile, in particular an individual user profile. It is advantageous here if the input means are so to speak attracted by the point, at which the user is to input something, such that an input is made much easier as a function of the user profile; the user is regularly prompted to input, which makes the inputting of standard commands significantly easier. Fast and specific inputting can be effected by means of a positive acceleration, i.e. a fast attraction of the input means. Conversely a negative acceleration causes the input means or visualization of the input means to move increasingly slowly toward the corresponding input point as it approaches an operating element. As a result the system makes inputting difficult. It regularly rejects a simple assumption of confirmation, such that a user has to overcome an increasing resistance. This focuses the attention of the user and prevents input errors.

A further advantageous embodiment of the invention is characterized in that one or more operating elements and/or input areas have an input block for data and/or commands as a function of the user profile, in particular an individual user profile. It is advantageous here if users, who do not have corresponding rights, can be prohibited totally from inputting in specific areas or confirming specific commands and this is also reliably prevented by the system. The input block can for example be configured such that the attraction factor between the input means and a corresponding operating element is set to zero. In this instance the operating element is no longer accessible to the input means. There is a type of protected zone around the operating element.

A further advantageous embodiment of the invention is characterized in that the system has means for displaying additional information relating to the operating element and/or the input areas. Further information can thereby also be provided for the user, as a function of the position of the input means or their visualization on the operator interface at that time. For example when approaching a corresponding operating element, the user can be made aware of certain characteristics of the operating element as a function of their user profile. A user with relatively few rights can for example be informed that they cannot input here, as they do not have the necessary rights. In contrast a user with a large number of rights can be informed about what the system requires as an input here or how important an input is or information can be provided about previous inputs, such that the user can see a certain history. Any additional information could be possible here as a function of the user profile and the corresponding point on the operator interface.

A further advantageous embodiment of the system is characterized in that provision is made for the additional information to appear on the operator interface as the input means reach and/or approach an operating element and/or an input area. Different information can therefore also be supplied as a function of a radius about the corresponding point or input area. In the case of particularly safety-critical input areas, as the user approaches, it can for example be visualized that said user is on the point of activating a safety-related button for example, whether by simply passing the mouse over it or by moving the input means into a certain radius of the button or by clicking on the button with the mouse. It is possible here for the additional information to be color-coded, such that a corresponding warning color appears with the visualization of the position of the input means when safety-related input areas are approached.

A further advantageous embodiment of the invention is characterized in that the system has a mouse for inputting commands and/or data as its input means. This makes inputting much easier for the user, as a mouse can be used as the standard input means without further ado in the standard manner by a large number of potential users and the mouse can be operated simply and intuitively. Special training is then not required for the system. Mouse inputs can be configured such that it is either necessary to click on an action button or the action button is activated when the mouse pointer comes within a defined radius of the button.

A further advantageous embodiment of the invention is characterized in that the system has a virtual mountain range stored behind the operator interface to determine the accessibility of the operating element and/or input areas. In this manner the attraction factor, which attracts or repels the inputs means to or from specific operating areas or elements, can advantageously be configured using the slopes of the mountains and valleys. The mouse speed is thereby determined or influenced using these slopes of the virtual mountain range. If for example a button or operating element is located at the top of a high mountain, inadvertent closing becomes almost impossible, as the operator has to overcome a steep slope. In such a case it can be assumed that no unwanted inputs can result at operator interfaces used to control critical processes. The opposite example would be a button or input field in a valley. Because it is going downhill, the input means, for example the mouse, accelerates when moved toward the button. It is thus possible to guide an operator to the operating elements where the inputs should actually be effected. Storing these attraction factors in the system in the form of a virtual mountain range makes it simple to parameterize or create a corresponding operator interface.

A further advantageous embodiment of the invention is characterized in that the input areas and/or operating elements are accessible to the input means for inputting commands and/or data as a function of the user profile and/or the system due to system-internal requirements. It is advantageous here if the system itself can so to speak facilitate or force an input, if an input is required at a corresponding point, as well as inputs being effected as a function of the user profile, for example as a function of access or input rights. If specific confirmations are required from a user, so that the system can control a process for example, this advantageous embodiment of the invention allows a corresponding user input to be forced. It is also advantageous here if there can be a combination of user profile and system influence on the accessibility of specific input windows or operating elements. The system so to speak prompts only authorized or qualified users to input specific data or to confirm specific commands.

BRIEF DESCRIPTION OF THE DRAWINGS

The invention is described in more detail below with reference to the exemplary embodiments illustrated in the figures, in which.

DETAILED DESCRIPTION OF INVENTION

Figure 1:
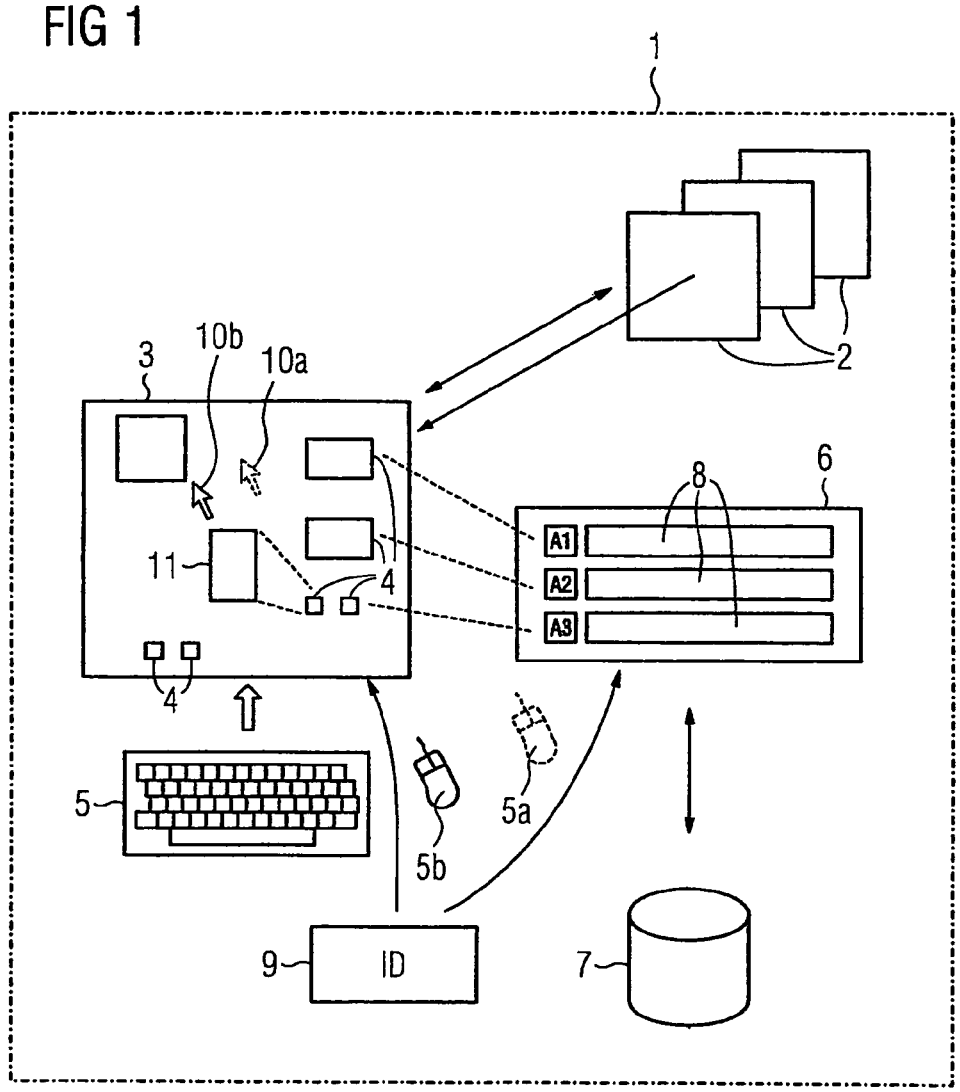
FIG. 1 shows a schematic diagram of the system.

FIG. 1 shows an exemplary embodiment of a system 1 for user-specific control of operator inputs in software components 2. The system 1 comprises an operator interface 3, via which one or more software components 2 can be operated by one or more users. On the operator interface 3 are input areas 4 for inputting data or operating elements 4 for confirming commands. The system 1 has input means 5, 5a, 5b, by means of which users can input to the operating elements 4 or input areas 4. The input means 5, 5a, 5b have a corresponding visualization 10a, 10b on the operator interface 3. The system 1 also has a user profile 6, in which the different operating options are managed for different elements. In one possible advantageous embodiment individual rights 8 for different users are managed in the user profile 6. The user profiles 6 or user rights 8 of the individual users can be stored in a memory 7. The system 1 also has identification means 9 for identifying different users. Additional information 11 relating to individual operating elements or input areas 4 can be displayed on the operator interface 3.

If a user is identified in the system 1 by means of the identification means 9, said user can use specific operating elements 4 on the operator interface 3 for inputting, or said elements are available to said user for inputting, with the aid of the system 1 and a user profile 6 stored in the system 1. The user can for example be identified by inputting a password or even by the collection of biometric data, such as finger prints or pattern recognition of eye parameters or facial features.

Corresponding individual user rights 8 can also be stored in the user profile 6 as a function of the identified user. These user rights 8 allow the user to effect specific inputs via the operating elements or input means 4. Input is controlled on the operator interface 3 itself, in that individual operating elements or input windows 4 are more or less accessible to the input means 5 as a function of the user and their user profile 6. In other words inputting is made easier or more difficult as a function of the user profile 6. This can be achieved for example in that the input means 5, for example a mouse, is positively attracted by the operating elements 4 on the operator interface 3, when an input or simple confirmation by a user is required. This positive attraction can for example be achieved by increasing acceleration of a mouse pointer for example as it approaches the operating element 4.

If an input is to be made more difficult for all users or for certain users specifically as a function of user rights 8, the corresponding operating element 4 can so to speak repel the input means 5, for example a mouse. The mouse pointer is hereby slowed for example as it continues to approach the operating element 4. In other words the mouse pointer is subject to negative acceleration. As it approaches the corresponding operating element 4, it becomes more difficult for the user to approach the element and it is necessary to overcome a resistance. It is possible thus to prevent input errors or unintentional inputs or confirmation of commands by users. An input field or operating element 4 can also be blocked totally for use by a user as a function of the user profile 6 and optionally as a function of existing user rights 8. In this instance the attraction or acceleration factor is set to zero, such that the mouse pointer, i.e. an element 10 visualizing the mouse input means 5, does not reach the operating element 4. Inputs by unauthorized users can thus be prevented.

There are a number of options for input means 5. In the exemplary embodiment shown a keyboard and mouse are configured as the input means 5. It is however also possible for simple eye movements or features of a user to be recorded using a camera and to be used for inputting on the operator interface 3. The system 1 allows one or more software components 2 to be operated simultaneously via the operator interface 3. The user profiles 6 and the user rights 8 stored therein can be stored in a memory 7 in the system 1. This stored data is then accessed via the user profile 6.

The accessibility of certain operating elements or windows for data inputs 4 does not just have to be controlled via the user profile 6. Rather the system 1 itself is able, if necessary, to direct a user positively to a specific input window or input area 4. If the system 1 for example requires specific data in order to be able to continue to operate during a process control, it can so to speak demand this data from the user, by increasing the attraction to a specific input element or input window 4 such that the user preferably inputs data at this point. If necessary the system 1 can thus so to speak demand data from the user.

Figure 2:
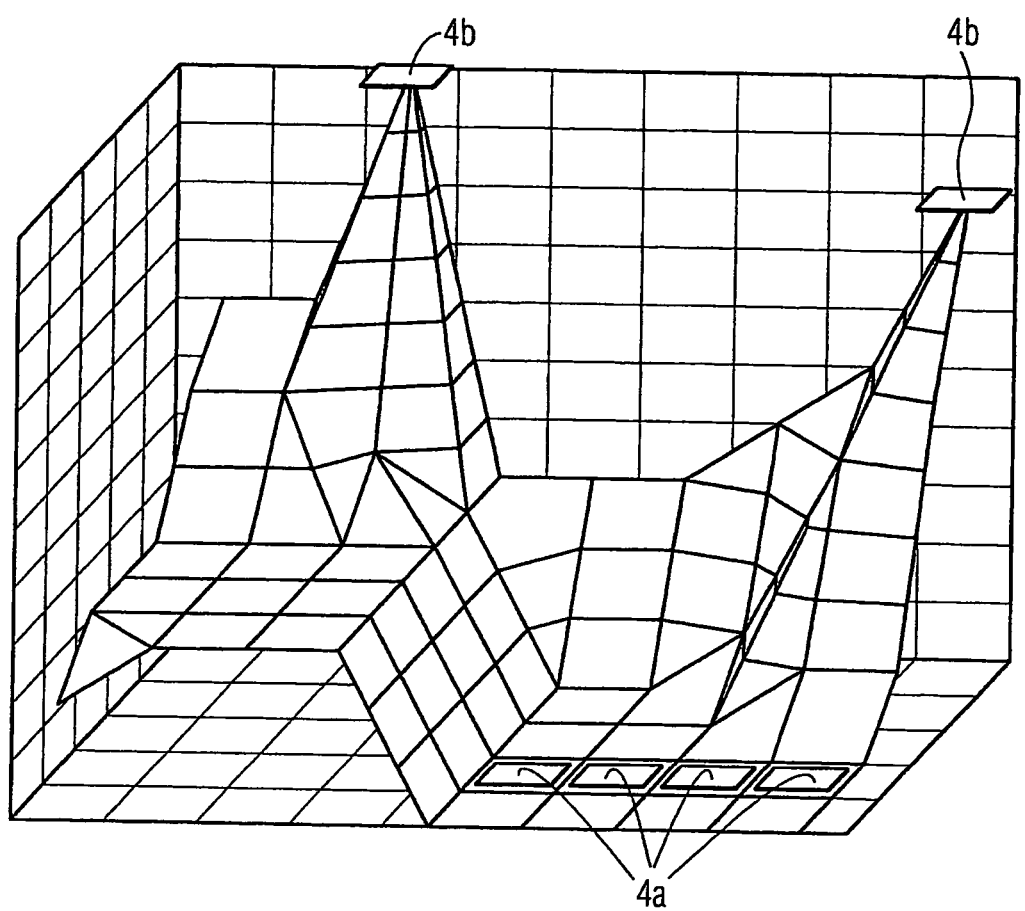
FIG. 2 shows a schematic illustration of the virtual mountain range to configure the attraction factor.

The exemplary embodiment shown in FIG. 2 shows how positive and negative acceleration can be configured by means of a virtual mountain range on the operator interface 3. Individual operating elements 4a, at which a user should preferably input data, are for example located in a depression or valley. The visualization means 10 for the input means 5 are then attracted by this valley, so that inputting is made easier. Operating elements 4b, into which something of lower priority is to be input or at which a user should pay greater attention, are for example on a mountain, such that the user has to overcome a greater resistance before inputs can be effected. This prevents corresponding input errors at these operating elements 4b. Operating elements can also be located at such a high level or on such a high mountain that they can no longer be accessed by a specific user as a function of an optionally existing user right 8. A corresponding virtual mountain range, as shown in FIG. 2, can be stored individually as a function of the user rights 8 stored in the user profile 6 for each of the possible users of the system 1. The corresponding operating elements 4 are then located at different heights and depths of the virtual mountain range.

To summarize, the invention relates to a system 1 and a method for user-specific intuitive and reliable control of operator inputs in software components 2 with operator interfaces 3. Different operating elements 4 on an interface 3 are accessible with differing degrees of ease for inputting data or executing confirmation actions, for example an OK click with the mouse. It is made easy or more difficult for a user to effect an input. This is achieved in that input means 5, e.g. a mouse, are either attracted or repelled by the corresponding input areas 4. Input errors are thereby prevented.

The invention claimed is:

1. A computer system configured to provide user-specific control of operator inputs into software components of the computer system, comprising:
   at least one graphical operator interface for operating at least one software component of the computer system;
   input areas or operating elements arranged on the operator interface and including input units for inputting commands or data, wherein the input units are represented by corresponding graphical objects on the graphical operator interface;
   at least one user profile stored in a memory of the computer system for defining a desired performance of at least one of the input areas respectively operating elements, wherein an accessibility of the input areas respectively operating elements by the input units is included in the user profile such that different users have access to different input areas respectively operating elements using the input units; and
   at least one virtual mountain range stored in the memory of the system, the virtual mountain range correlated to the graphical operator interface with a plurality of virtual features selected from the group consisting of a mountain summit and a valley to determine a degree of accessibility of the input areas respectively operating elements, wherein the degree of accessibilty modifies at least one operational characteristic of a respective input unit and is based on a location of the graphical object that represents the respective input relative to a respective virtual feature of the mountain range.

2. The system according to claim 1, wherein the user profile defines the performance of the at least one input area respectively operating element based upon individual access or operating rights.

3. The system according to claim 2, further comprising a memory unit for storing the access respectively operating rights, wherein the access respectively operating rights are administered by the user profile.

4. The system according to claim 1, further comprising a recognition unit for identifying a user.

5. The system according to claim 1, wherein the graphical objects representing the input units are accelerated or retarded upon approaching at least one of the operating elements respectively input areas by the graphical objects based on the user profile.

6. The system according to claim 1, wherein at least one of the operating elements respectively input areas comprise an input block for entering data or commands based on the user profile.

7. The system according to claim 1, further comprising a display unit for displaying additional information related to the operating elements respectively input areas.

8. The system according to claim 1, wherein the additional information is displayed upon approaching or reaching at least one of the operating elements respectively input areas by the input units.

9. The system according to claim 1, wherein the input units comprise a computer mouse.

10. The system according to claim 1, wherein the accessibility of the input areas respectively operating elements is determined by system-internal requirements.

11. A method for providing user-specific control of operator inputs into software components of a computer system, comprising:
    providing an operator interface for receiving input commands or data;
    entering the input commands respectively data into input areas or operating elements arranged on the operator interface; and
    controlling at least one software component of the computer system by using the graphical operator interface, wherein
       a performance of at least one of the operating elements respectively input areas is defined by at least one user profile, and
       an accessibility of the input areas respectively operating elements is included in the user profile such that different users have access to different operating elements respectively input areas using the input units;
    storing at least one virtual mountain range in a memory of the computer system; and
    correlating the virtual mountain range to the graphical operator interface with a plurality of virtual features selected from the group consisting of a mountain summit and a valley for determining a degree of accessibility of the input areas respectively operating elements, wherein the degree of accessibilty modifies at least one operational characteristic of a respective input unit and is based on a location of the graphical object that represents the respective input unit relative to a respective virtual feature of the mountain range.

12. The method according to claim 11, wherein the user profile defines the performance of the at least one input area respectively operating element based upon individual access or operating rights.

13. The method according to claim 11, wherein the access respectively operating rights are stored in a memory, the access respectively operating rights administered by the user profile.

14. The method according to claim 11, further comprising automatically identifying a user and selecting a corresponding user profile as the user profile.

15. The method according to claim 11, wherein the graphical objects representing the input units are accelerated or retarded upon approaching at least one of the operating elements respectively input areas by the graphical objects based on the user profile.

16. The method according to claim 11, wherein the user profile is configured to block at least one of the operating elements respectively input areas from accepting at least one of the input commands respectively data.

* * * * *